United States Patent [19]

Kamimura et al.

[11] 3,814,259

[45] June 4, 1974

[54] CYLINDRICAL VACUUM FILTER

[75] Inventors: Seigoro Kamimura; Masaji Imai; Takeo Azegami; Youzi Fuzii, all of Nagaoka, Japan

[73] Assignee: Ohara Iron Works Co., Ltd., Nagaoka-shi, Niigata-ken, Japan

[22] Filed: June 5, 1972

[21] Appl. No.: 259,720

[52] U.S. Cl. ............. 210/391, 74/241, 210/DIG. 3, 210/401
[51] Int. Cl. ........................................ B01d 35/16
[58] Field of Search ...... 74/241; 210/393, 400, 401, 210/402, 403, 404, DIG. 3, 411, 391; 100/93, 118, 152, 154

[56] References Cited
UNITED STATES PATENTS

| | | | |
|---|---|---|---|
| 3,077,990 | 2/1963 | Peterson | 210/401 |
| 3,197,030 | 7/1965 | Black | 210/400 |
| 3,288,296 | 11/1966 | Hils | 210/400 |
| 3,618,782 | 11/1971 | Iwatani | 210/401 |

*Primary Examiner*—Samih N. Zaharna
*Assistant Examiner*—T. A. Granger
*Attorney, Agent, or Firm*—Woodhams, Blanchard and Flynn

[57] ABSTRACT

A cylindrical vacuum filter, in which the circumferences of both axial end walls of the rotary suction drum are provided with axially projecting circular edges. Each of said circular edges is provided with a circular guide projection formed around the middle thereof. A pair of endless chains having a length greater than the circumference of the rotary drum are placed around said circular edges so that the connecting links on opposite sides of the chain hold said guide projection therebetween while the part of the chain which is clear of the rotary drum is engaged with sprockets fixed on both ends of the shaft of each roller of the group of guide rollers installed outside the rotary drum. An endless filter cloth covers the surface of the rotary drum and has the same length as said chains and is detachably fastened to the chains by its hems by means of hooks disposed inside the chains and is devised to run in a zigzag path as guided by the group of guide rollers. Air nozzles disposed so as to be close to and to open toward the back of a portion of the filter cloth in the zigzag path.

4 Claims, 7 Drawing Figures

CYLINDRICAL VACUUM FILTER

BACKGROUND OF THE INVENTION a. Field of the Invention

The present invention relates to a cylindrical vacuum filter for the purpose of separating solid matter from impure water.

b. Description of the Prior Art

As the basis of figuring out the filtration efficiency of a vacuum filter, there is known Kerman's equation as follows:

$$dV/dt = PA^2/\mu(rCV+RmA)$$

wherein,
- $dV/dt$: filtration efficiency, cm$^3$/sec,
- $V$: filtration volume, cm$^3$,
- $t$: time of filtration, sec,
- $\mu$: viscosity of filtrate, g/cm, sec,
- $P$: filtration pressure, g/cm$^2$,
- $A$: filtration area, cm$^2$,
- $r$: specific resistance of sludge, sec$^2$/g,
- $C$: concentration of solid matter, g/cm$^3$,
- $Rm$: resistance of filter material, sec$^2$/cm$^2$ In the conventional cylindrical vacuum filters, a big rotary suction drum is simply wound with an endless filter cloth having a length greater than the circumference of said rotary drum. The part of the filter cloth which is clear of the rotary drum moves through a zigzag path as its passes around a group of guide rollers disposed outside the rotary drum, thereby causing the cake adhering to the surface of the filter cloth to fall off by virtue of its own weight or by washing said cloth.

Examination of the filtration efficiency of such conventional cylindrical vacuum filters on the basis of the foregoing equation leads to the finding that, in order to enhance the filtration efficiency $dV/dt$, if the filtration pressure P is fixed, it will suffice to augment the filtration area A per unit time through rapid rotation of the rotary drum and simultaneously minimize r and Rm by lessening the thickness of the adhering layer of cake as well as the filter cloth.

The conventional cylindrical vacuum filters, however, have been so designed that the endless filter cloth is just simply wound round the rotary drum and there is provided no mechanism whatever for the purpose of holding the filter cloth tightly on the rotary drum. Therefore, the filter cloth is apt to meander and become crumpled, and accordingly, it is required to be rather thick to avoid such troubles. Further, the exfoliation of the cake is based on gravity fall making good use of the weight of the cake per se, and therefore, when the thickness of the cake is lessened, it is more difficult for the cake to fall off the cloth. Accordingly, it is inevitable that the layer of the cake is thick. Besides, because the filter cloth as well as the layer of cake are thick, it is impossible to accelerate the speed of movement of the filter cloth by increasing the speed of rotation of the rotary drum.

For the reasons set forth above, the conventional cylindrical vacuum filters have been not fully satisfactory in that enhancement of their filtration efficiency is not feasible.

SUMMARY OF THE INVENTION

The principal object of the present invention is to provide an improved cylindrical vacuum filter which eliminates the aforementioned defects of the conventional cylindrical vacuum filters.

Another object of the present invention is to provide a cylindrical vacuum filter which is so devised that a pair of endless elastic bands are wound around the suction drum and are disposed inside the position where the aforesaid chains are located and these bands are respectively engaged with inner guide projections disposed inside the outer guide projections, to thereby ensure the prevention of meandering of the filter cloth while it is moving and also to segregate airtightly the inside and outside of the filter cloth.

A still further object of the present invention is to provide a cylindrical vacuum filter which is so devised that both hems of the filter cloth are enlarged by virtue of an elastic cord wrapped therein and these enlarged hems of the filter cloth are held inbetween upwardly projecting hooks and downwardly projecting hooks provided alternately on the adjoining connecting links of the chain, whereby the filter cloth can be easily attached to or detached from the chain.

Still another object of the present invention is to provide a cylindrical vacuum filter which is so devised that the filter cloth is prevented from meandering or getting crumpled while it is moving, thereby rendering it possible to employ a thin filter cloth.

An additional object of the present invention is to provide a cylindrical vacuum filter which is so devised that air nozzles are disposed close to and opening toward the back of the filter cloth in the zigzag portion of its path, whereby the cake adhering to the surface of the filter cloth can be forcibly exfoliated by virtue of the air current jetted through said air nozzles and the thickness of the layer of cake adhering to the filter cloth can be reduced accordingly.

Yet another object of the present invention is to provide a cylindrical vacuum filter which can employ a thin filter cloth and reduce the thickness of the layer of cake adhering to the filter cloth, thereby making possible a high-speed operation and enhancement of the filtration efficiency of the filter.

BRIEF DESCRIPTION OF THE DRAWINGS

In the accompanying drawings.

DETAILED DESCRIPTION OF THE INVENTION

Figure 1:
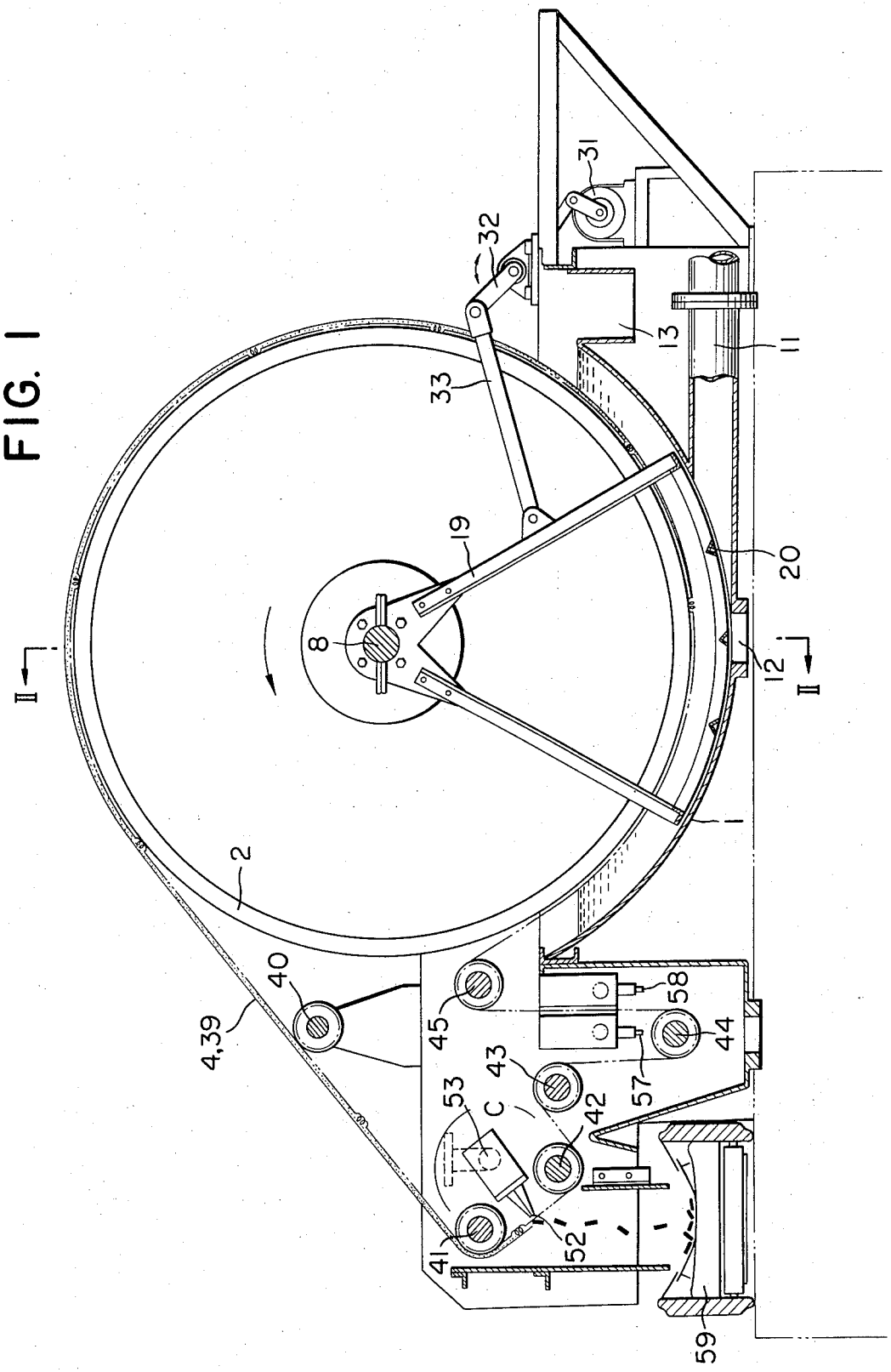
FIG. 1 is an end view, partially in section, of an apparatus embodying the present invention.
Figure 2:
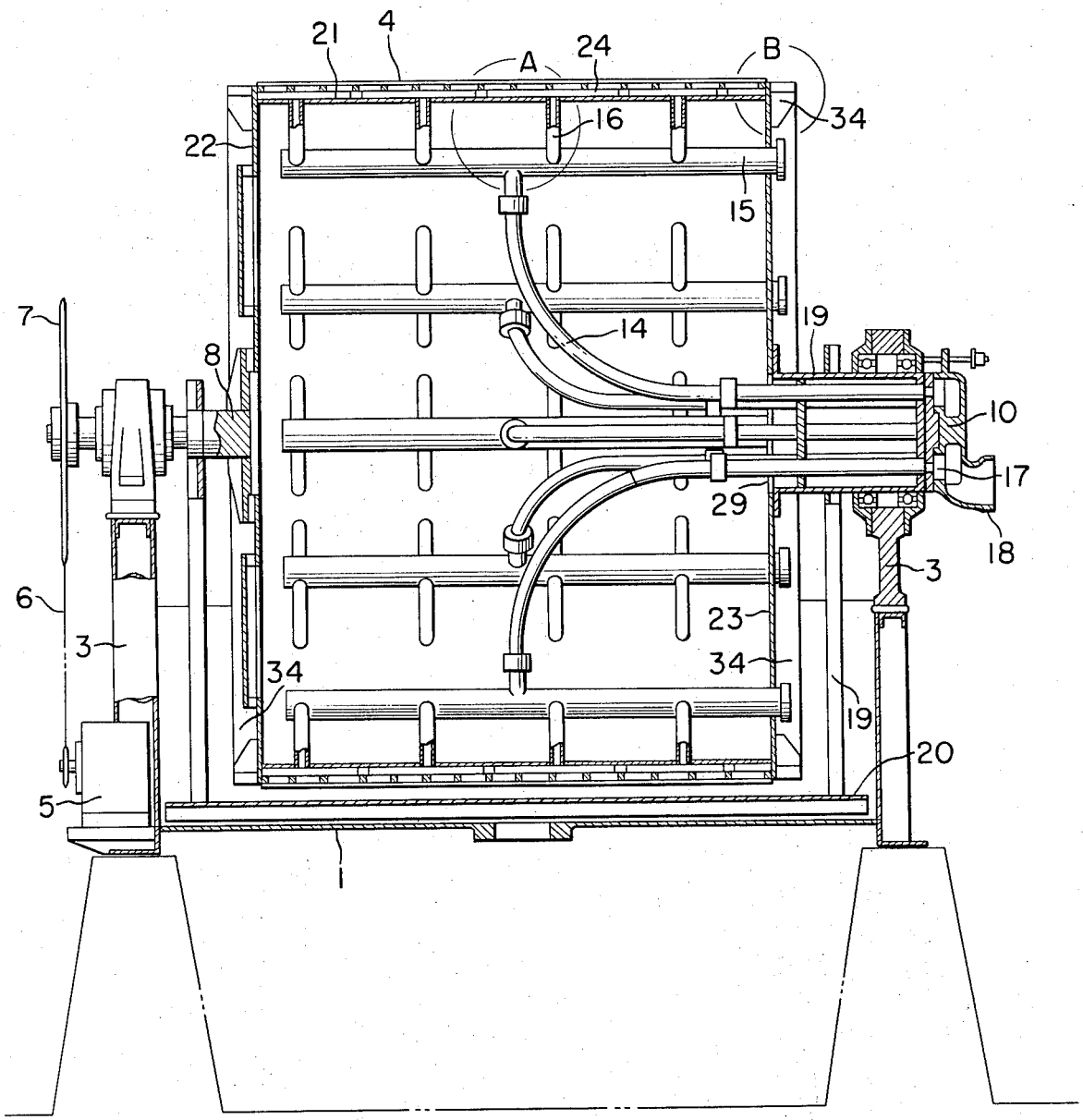
FIG. 2 is a sectional view taken along the line II—II of FIG. 1.

In FIGS. 1 and 2, the reference numeral 1 denotes a semicylindrical foul-water tank having a feeding pipe 11 and a discharging pipe 12 disposed at its bottom and an overflow pipe 13 provided on one side of the upper part thereof. The feeding pipe 11 receives the foul water from the storage tank (not shown herein), and the discharging pipe 12 and the overflow pipe 13 return the surplus water to the storage tank.

2 denotes the rotary filter drum, which comprises a cylindrical wall 21 and end walls 22, 23. The drum 2 is rotatably supported on the frame 3 by means of the rotary shaft 8 fixed to the end wall 22 and the casing 9 fitted in the central opening 29 of the end wall 23. The lower part of this rotary filter drum 2 is inserted into the open upper end of said tank 1 and is submerged in the foul water within the tank 1. The end of the rotary shaft 8 is provided with a sprocket 7 fixed thereto, and in response to rotation of the driving shaft of the motor 5 mounted on the frame 3, the drum 2 is rotated slowly by means of the chain 6 engaged with said sprocket 7.

The interior of the casing 9 is equipped with several suction pipes 14. One end of each suction pipe 14 opens outside the casing 9 while the other end thereof is connected with one of the main suction pipes 15 which extend axially inside the drum 2. Each of these main suction pipes 15 has branch suction pipes 16 disposed thereon.

The outer end of the casing 9 is fitted in the suction disc 10 which is fixed on the frame 3. The inside of this suction disc 10 is provided with a valve plate 17 which functions to open a suction pipe 14 only when the opening of that suction pipe 14 is located in a prescribed place. The outside of the disc 10 is provided with an elbow 18 which is connected with a suction apparatus (not shown herein).

An agitator 19 is rotatably supported on shaft 8 and casing 9. The agitator has agitating plates 20 disposed in tank 1 and extending parallel to the axis of the drum 2. This agitator 19 is connected by a connecting rod 33 with the oscillating rod 32 which is in turn oscillated by operation of the motor 31 mounted on the frame 3. The agitating plates 20 are oscillated in the space between the tank 1 and the drum 2 by operation of the motor 31.

Figure 3:
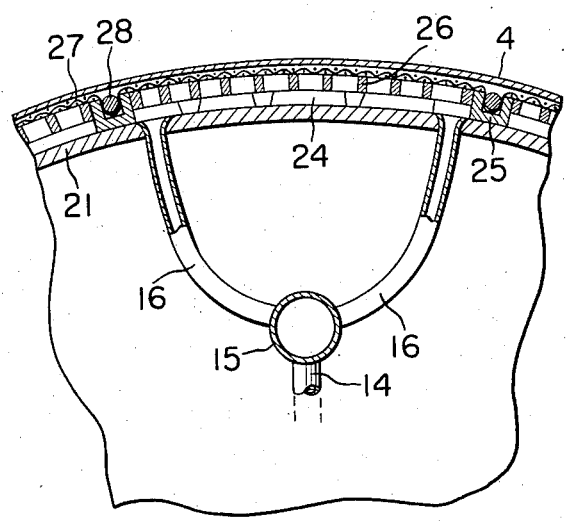
FIG. 3 is a transverse sectional view, on an enlarged scale, of the portion A in FIG. 2.

The drum 2 is provided with a plurality of bulkheads 25 installed on the outer surface of the cylindrical wall 21 and extending axially therealong as shown in FIG. 3. Between these bulkheads 23 there are formed a plurality of compartments 24. A perforated plate 26 made of plastic which encircles the cylindrical wall 21 is disposed at a fixed distance from the surface of said wall 21 so as to cover the compartments 24, and its surface is covered with a net 27 which is fastened in place by wires 28 fitted in the grooves of the bulkheads 25. The outer end of the aforesaid branch suction pipe 16 penetrates the cylindrical wall 21 to open into the compartment 24.

Figure 4:
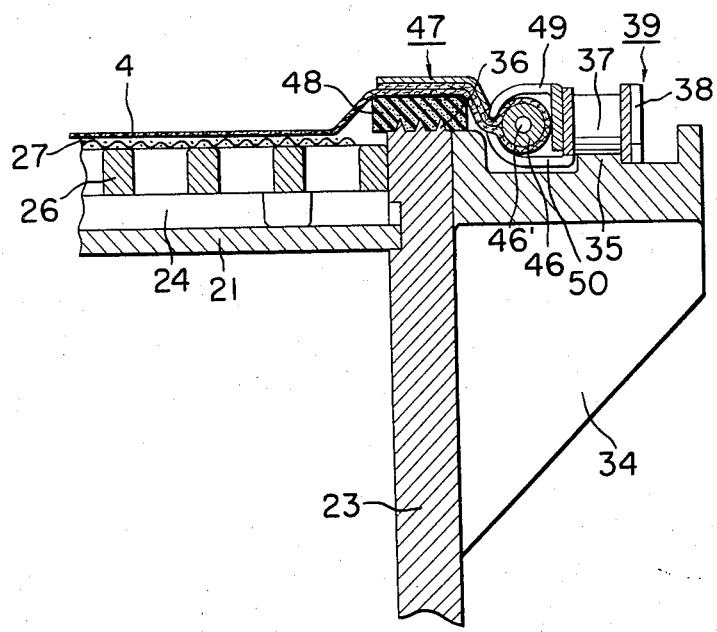
FIG. 4 is a view, on an enlarged scale, of the portion B in FIG. 2.
Figure 5:
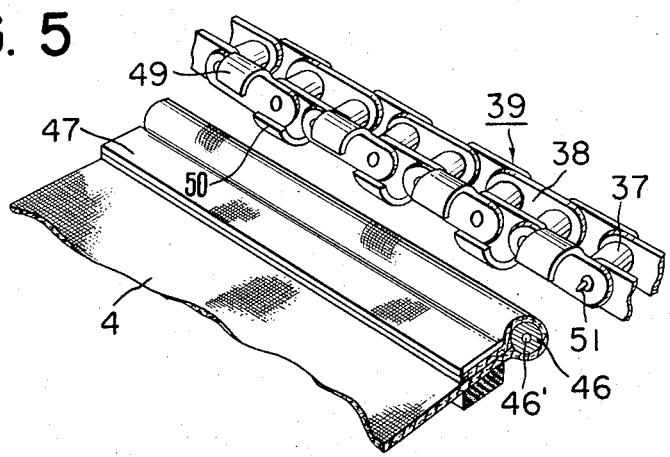
FIG. 5 is an exploded perspective view of a fragment of the cloth and chain.

To the circumference of each axial end wall of the drum 2 there is attached a circular edge 34 whose outer surface is provided with an axially outer guide projection 35 as shown in FIG. 4. The radially outer edge of both end walls 22, 23 is provided with a plurality of axially inner guide projections 36.

The chains 39 are composed of rollers 37 and links 38 and are mounted on the guide projections 35. Each of the chains 39 is endless and has a length greater than the circumference of the drum 2. The portions of the chains which are spaced from the drum 2 are engaged with sprockets fixed to the respective ends of the shafts of the guide rollers 40–45 mounted on the frame 3. The chains are guided through a zigzag path by rollers 40–45.

The filter cloth 4 which is wound round the drum 2 and which effects liquid removal consists of a thin, durable cloth such as nylon fabric, and its width is slightly larger than the axial length of the drum 2 while its length is equal to the length of the chains 39. Both hems at the opposite axial end of this filter cloth are provided with a reinforcing cloth 47 sewn thereon. The filter cloth is folded back on itself and encloses an elastic cord 46 containing a core 47' so as to form an enlarged hem. The inner side of the hem is provided with a sponge rubber band 48 for engaging the axially inner guide projections 36 of the drum 2, as shown in FIG. 4.

The filter cloth 4 is fastened to the chain 39 by means of its enlarged hems padded with the elastic cord 46 as described above. For this purpose, the adjacent axially inner connecting links 38 of the chain 39 are alternately provided with a downwardly opening hook 49 and an upwardly opening hook 50. Said downward and upward hooks hold the enlarged hems of the filter cloth 4. Moreover, needles 51 are provided on the inside of connecting links 38 to stick into the filter cloth.

The portion of the filter cloth 4 which is spaced from the drum 2 is moved through a zigzag path by the guide rollers 40–45. Between the pair of guide rollers 40, 41, there is installed the blowing apparatus 53 which faces the back of the filter cloth.

Figure 6:
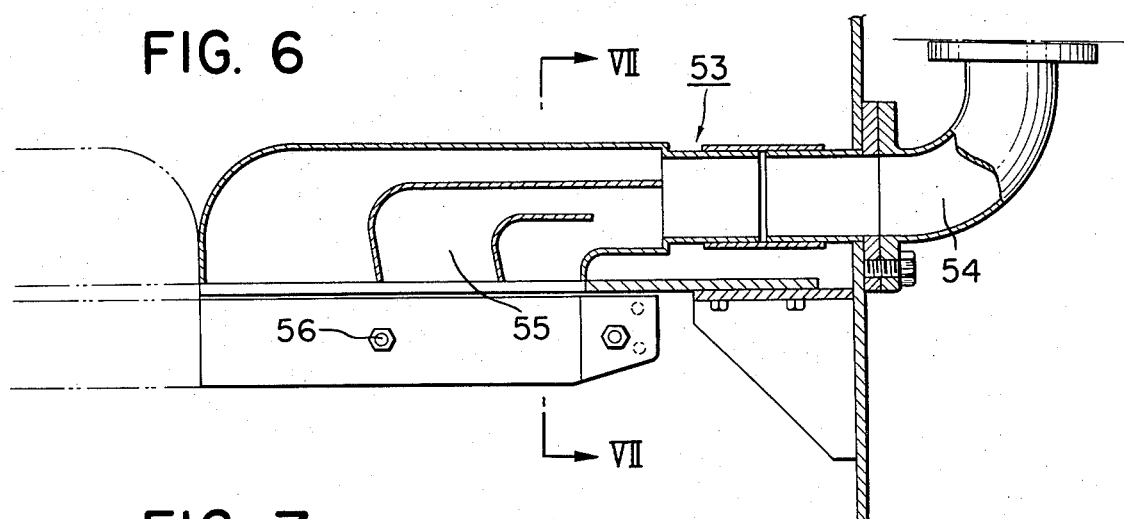
FIG. 6 is a transverse sectional view, on an enlarged scale, of the portion C in FIG. 1.
Figure 7:
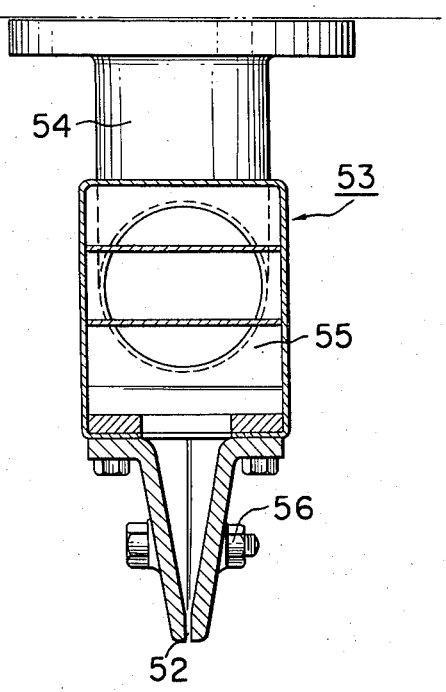
FIG. 7 is a sectional view, on a further enlarged scale, taken along the line VII—VII of FIG. 6.

As shown in FIGS. 6 and 7, this blowing apparatus is so devised that the blowpipe 54 connected with the blower (not shown herein) is connected with the distributing chamber 55, and the opening disposed at the bottom of this chamber 55 is provided with a nozzle 52 which is adjustable by means of the adjusting bolt 56.

Beneath the portion of the filter cloth 4 facing the blowing apparatus, there is installed the conveyer 59 for conveying away the materials dislodged from the filter cloth.

The guide roller 43 serves as a dancer roller to strain the filter cloth 4 as well as the chain 39. Between this guide roller 43 and the final guide roller 44, there are installed a pair of spray nozzles 57, 58 facing the two sides of the filter cloth 4 for the purpose of washing said cloth.

Hereunder will be given an elucidation of how to perform the filtration of solid matter contained in foul water by employing the afore-mentioned apparatus.

While supplying the foul-water tank 1 with foul water through the feeding pipe 11, the motor 5 is set in motion to thereby move the drum 2 slowly in the direction of the arrow in FIG. 1. At the same time, through the operation of the suction apparatus (not shown therein) connected with the elbow 18, suction is drawn through the suction pipes 14 not closed by the valve plate 17, that is, the suction pipes 14 connected with the main suction pipes 15 which are located in the zone corresponding to the part of the circumference of the drum 2 contacting the filter cloth 4 as shown in FIG. 1. By virtue of this suction, the branch suction pipe 16 opening into the compartment 24 not only causes the solid matter to adhere to the filter cloth 4 through the compartment 24, the perforated plate 27 fitted in said compartment and the net 27, but also sucks water from the adhering layer of solid matter, and this water is collected in the suction apparatus through the suction pipe 14. The motor 31 operates the agitator 19 and the foul water within the foul-water tank 1 is agitated.

As the filter cloth 4 moves out of the foul water and moves round together with the drum 2, the water is removed in this way, and a dehydrated cake of solid impurities is moved by the cloth to the guide rollers. When the cake is located between the guide rollers 41, 42, an air current is jetted through the nozzles 52 of the blowing apparatus 53 which are disposed to face the back of the filter cloth 4, whereby the cake adhering to the filter cloth 4 falls off and is collected by the conveyer 59.

Subsequent to discharging the cake, the filter cloth 4 becomes situated between the guide rollers 44, 45, where at the surface and the bakc of the cloth 4 are washed with water from the spray nozzles 57, 58 disposed along both sides of the cloth.

For the purpose of moving the filter cloth 4 in proper fashion, both hems of the filter cloth 4 are provided with a reinforcing cloth and are enlarged with an elastic cord 46, said enlarged hems being held between the hooks 49 and the hooks 50 which are alternately positioned on the adjacent connecting links 38 of the chain 39. The inner sides of the connecting links 38 of the chain are engaged with the outer guide projection 35 provided on the drum 2 and the chain also engages the sprockets fixed to both ends of the shafts of the guide rollers 40–45. The backs of the sponge rubber bands 48 attached to the vicinity of both hems of the filter cloth 4 are engaged with the inner guide projections 36 provided on the drum 2, so that the filter cloth 4 is prevented from meandering from side to side or becoming crumpled as it moves. Besides, the engagement of the sponge rubber band 48 and the inner guide projection 36 brings about a sealing effect to segregate both end edge portions of the filter cloth 4 from the central part of the drum 2 airtightly, so that the suction by the suction pipe 14 within the central part can be efficiently performed. Further, the cake adhering to the filter cloth 4 can be forcibly exfoliated from the filter cloth by virtue of the air current jetted by the blowing apparatus 53. Such being the case, the filter cloth does not get crumpled, and accordingly, it is possible to reduce its thickness. Not only that, inasmuch as the thickness of the adhering layer of cake can be reduced, the running speed of the filter cloth can be increased, and the filtration efficiency as a whole can be considerably enhanced.

Although a particular preferred embodiment of the invention has been disclosed hereinabove for the purpose of illustration, it will be understood that variations or modifications thereof which lie within the scope of the present invention as defined by the appended claims are fully contemplated.

We claim:

1. In a continuous rotary drum vacuum filter comprising a rotary drum movable through a tank containing the liquid to be filtered, said drum having filtering compartments on its circumference, and an endless filter cloth belt trained over said drum and also over rollers spaced from said drum which guide said filter cloth belt through a zigzag path, the improvement which comprises:

said filter cloth belt has enlarged resilient hems along both of its edges; a pair of endless roller chains each comprising rollers pivotally connected on opposite sides of the chain by connecting links, said chains being respectively disposed adjacent to and being connected to the edges of said filter cloth belt and extending with said filter cloth belt around a portion of said drum and also around said rollers, the connecting links of each chain facing the adjacent hem of the filter cloth belt having upwardly opening hooks and downwardly opening hooks positioned alternately along the entire length of the chain, the enlarged hems of said filter cloth belt being disposed between and partially encircled by said hooks of the respective chains so that the edges of the filter cloth belt are connected to the chains; said rotary drum having at each of its axial ends a radially outwardly projecting guide extending around the circumference of said drum, the connecting links on opposite sides of each chain being disposed on opposite sides of the adjacent cooperating guide so that movement of the chains around said portion of the circumference of the drum is closely guided by said guides on said drum; said rollers having means for engaging and guiding movement of said chains whereby the movement of said chains and said filter cloth belt is closely guided by said drum and said rollers; and first nozzle means disposed adjacent said rollers close to the beginning of said zigzag path for directing a blast of gas against the inner surface of said filter cloth belt for discharging cake therefrom.

2. A continuous rotary drum vacuum filter as defined in claim 1, in which said rotary drum has at each of its axial ends radially outwardly extending projections extending around the circumference of said drum, each of said projections being positioned at a location axially inwardly offset from the adjacent guide; an endless elastic band secured to said filter cloth belt adjacent each edge thereof and cooperating with the adjacent projections, said elastic bands engaging said projections for moving said filter cloth belt in concert with said drum.

3. A continuous rotary drum vacuum filter as defined by claim 1, in which second nozzle means are disposed adjacent said rollers following said first nozzle means in said zigzag path for directing washing liquid against said filter cloth belt.

4. A continuous rotary drum vacuum filter as defined in claim 1, in which said means on said rollers for engaging and guiding movement of said chains comprise sprockets fixed to the ends of said rollers and extending radially relative to the axes of the rollers.

* * * * *